Aug. 20, 1929.    K. SCHULTE    1,725,740
ROLLER CONVEYER
Filed May 4, 1925    2 Sheets-Sheet 1

Inventor:
K. Schulte
By Marks Clerk
Attys.

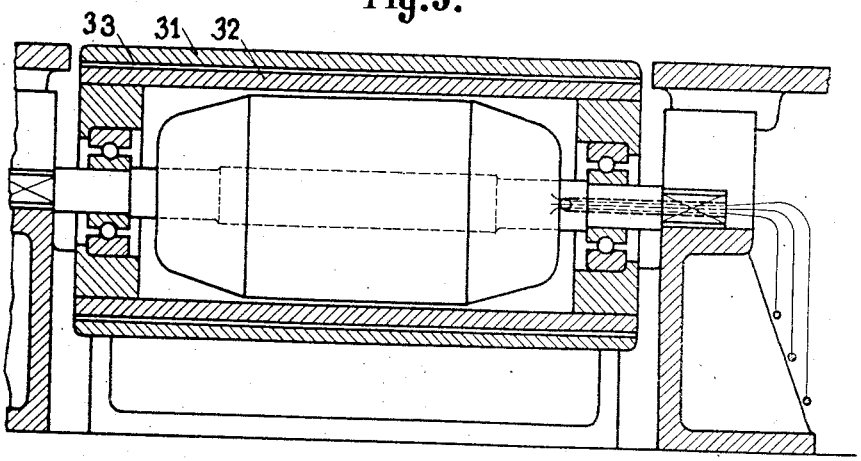
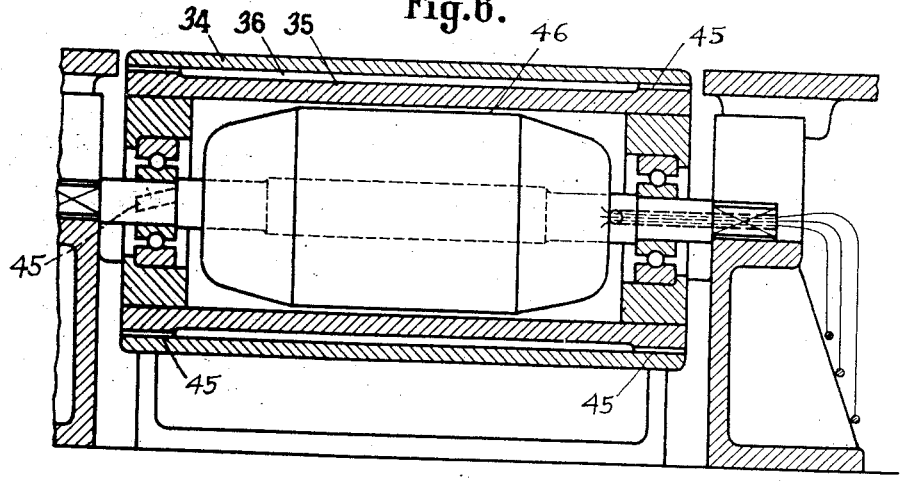
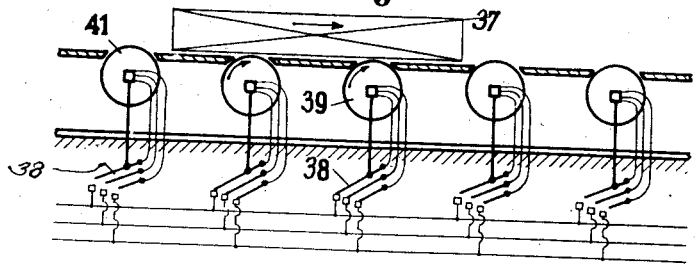

Patented Aug. 20, 1929.

1,725,740

UNITED STATES PATENT OFFICE.

KARL SCHULTE, OF DUISBURG-RUHRORT, GERMANY.

ROLLER CONVEYER.

Application filed May 4, 1925, Serial No. 27,983, and in Germany December 10, 1924.

This invention relates to rolling trains or trains of rolls such as are employed for example in metal rolling mills for conveying or moving objects from one place to another or from one part of a machine to another.

The rolls in such rolling trains have hitherto always been driven through mechanical motion transmitting devices. Power transmitting members are inserted between the power machine and the rolls to be driven, and these members generally consist of shafts that extend along the rolling train and are equipped with bevel wheels, spur gear wheels with intercalated motion changing wheels, chains, ropes, friction disks, hydraulic motors, air motors etc. The employment of the aforesaid means involves certain disadvantages, particularly in light and medium rapid rolling trains. These disadvantages are briefly as follows: When bevel wheels are used the rolling train has to be made rugged and heavy because the stresses due to the pressure between the teeth of the wheels have to be taken by the frame and transverse bearings of the rolling train. It is always necessary to provide separate transverse bearings, collar thrust bearings, and oil or grease boxes for the bevel wheels. The driving motor generally employed has so high a speed of revolution that it is necessary to provide speed change gearing between the motor and the transmission shaft that imparts the motion to the rolls.

All these parts require continual supervision and repairs. The breakage of any of these parts always results in a long stoppage of the machine. The bevel wheels are very noisy in operation. Similar drawbacks are encountered in rolling trains equipped with friction wheels instead of toothed wheels. This also applies to the driving of the rolls in succession through motion transferring or motion changing wheels and this method also consumes a considerable amount of power. Ropes and chains are particularly subject to wear and tear and their power transmission efficiency is very low. Air and hydraulic motors are a very inconvenient and dear form of power machine for driving rolling trains and their efficiency is also very low. The pipes and valves they require make the plant liable to external injuries.

When the train of rolls is not straight mechanical power transmitting members lead to difficulties in mechanical design.

The aforesaid disadvantages are removed by the present invention. This is accomplished by driving each roll of the rolling train by means of the simplest and cheapest form of electric motor, a motor with a short circuit or squirrel cage rotor. The actual power transmitting means consists in electrical conductors. The electric energy is transformed into energy of motion directly at the rolls without intercalation of any other machine elements of the kind referred to above.

The invention is illustrated by way of example in the drawing in which Fig. 1 is a plan view of a section of a rolling train in which the individual rolls are directly driven by motors with short circuit rotors.

Figs. 5 and 6 are detail sectional views through two different modified forms of the electrically driven rolls and, Fig. 7 is a diagrammatic view showing several of the rolls operatively connected with object operated switches.

Figure 1:
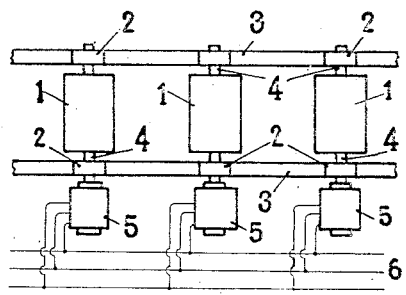

The rolls 1, Fig. 1 are journalled in bearings 2 suported on the frame 3. The shafts of the rolls extend out a considerable distance at one end and these extensions carry the short circuit rotors of electric motors 5 that are connected to an alternating current supply 6.

As the sudden rush of current that occurs when the three-phase motors are started causes no trouble in a foundry or metal rolling mill, the comparatively small motors with short-circuit rotors may be switched on in groups or all together. If necessary, the starting operation can be carried out with the aid of a step by step transformer.

At a given periodicity of the alternating current supply the number of poles in the roll motors must be such that the desired peripheral speed of the rolls is approximately attained.

Figure 2:
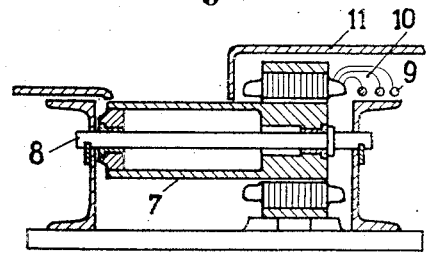
Fig. 2 is a longitudinal section of a roll of a rolling train in which the roll itself forms the rotor of a motor.

As it would be too costly to equip each motor with a separate complete roller and these motors would occupy considerable space at the side of the rolling train, the motors may be placed between the lateral beams 3, 3 that form the frame of the rolling train, see Fig. 2. By this arrangement the necessity of employing a separate short-circuit rotor is avoided and the roll 7 may rotate directly on the fixed shaft 8. By this means the arrangement is greatly simplified.

Figure 3:
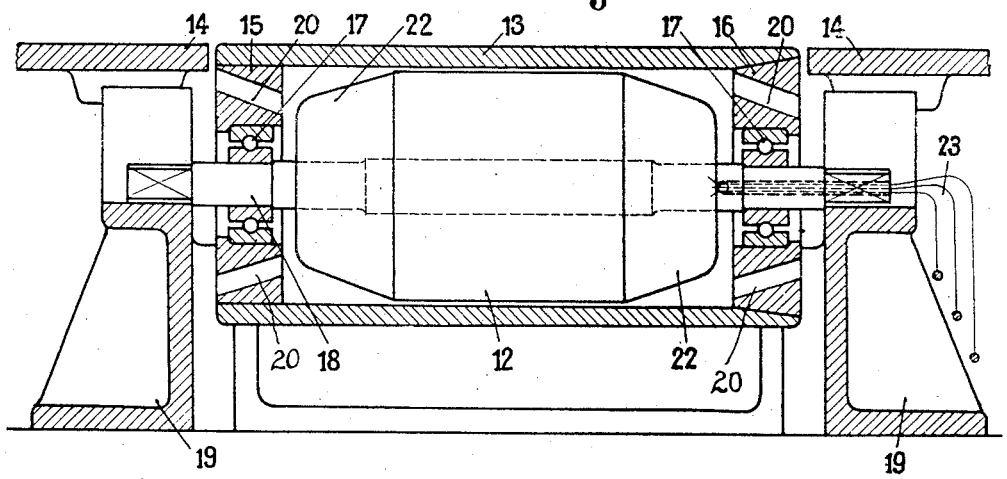
Fig. 3 is a longitudinal section of a roll in which the roll itself forms the rotor of a motor whose field magnet is inside the rotor.

Current is supplied to the field magnets in Fig. 2 from the mains 9 through tap wires 10. A disadvantage of this arrangement however, is that the cover plates 11 have to be raised at one side which, in many cases, is undesirable. For this reason the stationary field magnets 12 may be arranged within the roll 13 as shown in Fig. 3. By this arrangement a further simplification and cheapening of the plant is effected and the cover plates 14 at the side of the rolls remain smooth and may lie in the same plane as the other parts of these plates. The iron roll itself, which also acts as a short circuit roller is provided with a thick wall so as to enable powerful induced currents to be produced.

The end walls 15 and 16, which may be fixed in the roll by shrinkage of the latter or by the wedging effect of conical surfaces, supports the bearings, which may take the form of ball bearings 17. The ends of the shaft 18 are square or provided with corners and are fixed in the lateral frame members 19. They are thus stationary and do not rotate with the rotor or roll.

To prevent the accumulation of heat in the interior of the rolls, the end walls 15 and 16 may be provided with oblique channels 20 which continually convey cooling air into the interior of the roll. The stationary field magnet system 12 which is fixed on the shaft may consist in a known manner of laminated iron. The winding 22 is put on before the field magnet system is mounted in its final position. Current is conducted to the magnets by wires 23 placed in a bore in the shaft. Whenever a roll has to be repaired it can be removed in a few minutes from the frame of the rolling train and be substituted by a spare roll.

Figure 4:
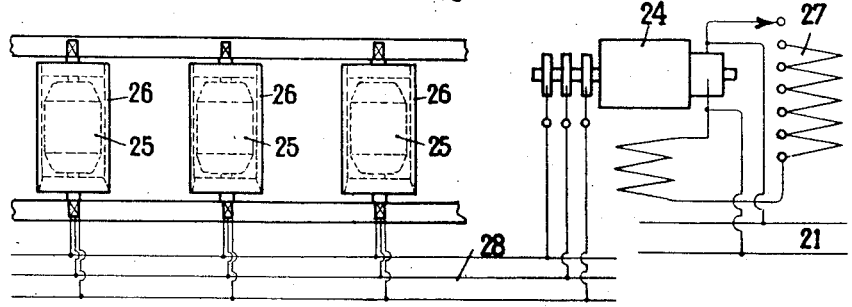
Fig. 4 shows the electrical connections between a rotary converter and the roll motors.

Fig. 4 shows an arrangement employed where suitable alternating current is not available and continuous current has to be taken from the supply mains. In such cases a rotary converter 24 is employed that converts the continuous current in the mains 21 is alternating current that is supplied to the conductors 28 leading to the roll motors. The converter 24, which takes the place of a motor that would have to be provided in any case even if the motion were transmitted from it to the rolls by mechanical motion transmitting means, may be placed at any convenient shielded spot at a distance from the rolling train.

The speed of revolution of the converter 24, the periodicity of the alternating current, and the number of poles of the field magnet system 25 are such that the desired peripheral speed of the rollers 26 is obtained. If the converter 24 is started by means of a starting resistance 27, the periodicity of the converted alternating current grows from zero to a maximum and consequently the rolling train will be started gradually and will attain its full speed without jerks.

The speed and direction of motion of the rolling train may be changed by regulating and reversing the converter 24 or the alternating current.

It will be obvious that any kind of electric motor may be employed, even if its construction is more complicated and it is more costly than the aforementioned motors with short circuit rotors.

In the modifications shown in Figs. 1–4 the actual rolls form the rotors of the motors. In certain cases this arrangement is objectionable, due to the fact that a heating of the roll may result in its becoming warped, and the small air gap between the field magnet poles and the rotor will then no longer obtain so that the magnet poles will brush against the interior of the roll or rotor. Besides, it is often necessary to construct the rotor in a special manner, as by forming it with slots, so as to reduce the eddy currents and mechanically increase the efficiency of the motor.

For this reason it will sometimes be found necessary to subdivide the peripheral wall of the roll and to make it in the form of two concentric cylinders. A roll of this kind is shown in Fig. 5. The external cylinder or sheath 31 contacts with the objects that are moved by the roll and the internal cylinder or metal member 32 operates as the torque producing member of the motor. Arranged between the two cylinders is a layer 33 which is an insulator of heat and electricity. To obviate all danger of the internal member 32 being deformed by violet blows, as in cases when rolled rods or the like fall on the rolling train, an air gap 36 is provided between the two cylinders, as shown in Fig. 6, so that even if the external cylinder is deformed the internal cylinder will still run true. As indicated in this figure the inner and outer cylinders or shells are maintained in spaced relation by spacing elements 45, and these are spaced outwardly in the direction of the longitudinal axis of the shaft from the gap 36 between the two shells, so that the air gap 36 extends entirely across that portion of the rotor which is contiguous to the air gap 46 so as to assure against mutilation of the inner shell or rotor due to deformation of the outer shell.

This air gap also acts as an insulator of heat and in this connection the spacing elements 45 may be arranged so as to enable a current of air to pass continually from one side of the roller to the other, a simple expedient for effecting the desired circulation of air consisting in merely disposing the spacing elements 45 obliquely to the axis of the stationary shaft, as suggested in Fig. 6. In the modification shown in Fig. 6 there is an external cylinder 34, an internal cylinder 35 and an air gap 36.

In rolling trains in which the rolls are directly electrically driven as shown, the arrangement may be such that the objects 37 conveyed by the rolls may be made to switch on and off the power automatically for each roll. Thus the weight of the object 37, Fig. 7, on reaching a roll 39 operates a switch 38 to switch on the power and on leaving a roll 41 the switch 38 belonging to the same is automatically opened.

I claim:

1. In a roller conveyer, a support, a plurality of electric motor devices mounted on said support and arranged in object transporting relation, said electric motor devices each including an electrically operated rotor constituting the object supporting and transporting means of the apparatus.

2. In a roller conveyer, a support, a plurality of electric motor devices mounted on said support and arranged in object transporting relation, said electric motor devices each including object supporting and transporting means and an electric rotor carried by said means.

3. In a roller conveyer, a support, a plurality of electric motor devices mounted on said support and arranged in object transporting relation, said electric motor devices each including object supporting and transporting means forming part of the rotor element of the electric motor device.

4. In a roller conveyer, a support, a plurality of electric motor devices mounted on said support and arranged in object transporting relation, said electric motor devices each including an electrically operated rotor constituting the object supporting and transporting means of the apparatus, a stationary shaft mounted on said support, and a stator carried by the shaft and located within the rotor.

5. In a roller conveyer, a support, a plurality of electric motor devices mounted on said support and arranged in object transporting relation, said electric motor devices each including an electrically operated rotor constituting the object supporting and transporting means of the apparatus, a stationary shaft mounted on the support, and a stator carried by the shaft and located within the rotor, said rotor being journaled directly on said shaft.

6. In a roller conveyer, a support, a plurality of electric motor devices mounted on said support and arranged in object transporting relation, said electric motor devices each including an electrically operated rotor constituting the object supporting and transporting means of the apparatus, said rotor including inner and outer portions, and means to reduce tendency of heat exchange between the outer and inner portions of the rotor.

7. A roller conveyer as claimed in claim 1, characterized in that the rotor is constituted by concentrically spaced inner and outer shells to reduce the tendency of the inner shell to become heated due to the material conveyed by the outer shell.

8. A roller conveyer as claimed in claim 1, characterized in that the rotor is constituted by concentrically spaced inner and outer shells to reduce the tendency of the inner shell to become heated due to the material conveyed by the outer shell and a heat insulating layer interposed between the inner and outer shells.

9. In a roller conveyer, a support, a plurality of electromotor devices mounted on said support, said electromotor devices each including an electrically operated rotor constituting the object supporting and transporting means, a stationary shaft on said support, bearings for the rotor mounted on said shaft, and a stationary stator carried by the stationary shaft and arranged within the rotor.

10. A roller unit for roller conveyers, including a relativetly stationary central part, an outer rotatable roller part, an electric motor stator and rotor elements carried by the stationary and rotatable parts, respectively.

11. A roller unit for roller conveyers, including a relatively stationary central part, an outer rotatable roller part, an electric motor stator and rotor elements carried by the stationary and rotatable parts, respectively, the roller unit being removable from a conveyer table to facilitate repair or replacement.

12. A roller unit for roller conveyers, including a relatively stationary central part, an outer rotatable roller part, an electric motor stator and rotor elements carried by the sationary and rotatable parts, respectively, the stationary part having extended ends adapted to be engaged and supported in a roller conveyer table.

13. A unit for roller conveyers, including a stator, a shaft supporting said stator having its ends extended and adapted to be engaged and supported in a conveyer table, a roll cylinder rotatably supported on the shaft and an electric rotor associated with the stator and carried by the roll cylinder.

14. An apparatus as claimed in claim 1 characterized by the provision of an electric circuit including the motor devices, normally open circuit controllers in said circuit each controlling the flow of current of one of the motor devices and means responsive to the application of an object to each motor device for actuating the circuit controller associated therewith.

15. In a roller conveyer, a support, a plurality of electric motor devices mounted on said support and arranged in object transporting relation, said electric motor devices each including an electrically operated rotor constituting the object supporting and transporting means of the apparatus, and a stationary shaft mounted on the support and rotatably supporting said rotor.

16. A roller unit for roller conveyers, including a stationary central shaft, a wholly inclosed electric motor having its stator mounted on said stationary shaft, an outer rotatable roller part constituting the rotor element for said motor, and bearings for said roller part having ventilating openings therein for the motor.

17. A roller unit for roller conveyers, including a stationary central shaft, a wholly inclosed electric motor having its stator mounted on said stationary shaft, an outer rotatable roller part constituting the rotor element for said motor, and bearings for said roller part having ventilating openings therein for the motor, said ventilating openings being obliquely disposed relative to the axis of the rotor and adapted to produce a continuous current of cooling fluid through the interior of the motor.

18. A roller unit for roller conveyers, including a stationary central shaft, an electric motor including a stator mounted on said stationary shaft, an outer rotatable roller part constituting the rotor for the stator and including two concentrically spaced shells, and spacing elements interposed between said shells supporting the ends of the outer shell on the inner shell.

19. A roller unit for roller conveyers, comprising a stationary central shaft, an electric motor including a stator mounted on said shaft and an outer rotatable roller part constituting the rotor and composed of two concentrically spaced shells, said rotor and stator having an air gap therebetween, and spacing elements interposed between the inner and outer shells located outwardly of the air gap in the direction of the longitudinal axis of the shaft for preventing mutilation of the inner shell due to deformation of the outer shell.

20. A roller unit as claimed in claim 18, characterized in that said spacing elements are obliquely disposed relatively to said shaft whereby to induce a draught of cooling fluid between the inner and outer shells.

21. A roller conveyer as claimed in claim 1, characterized in that the rotor is arranged externally of the motor and constitutes the object supporting and transporting means, and cover plates arranged at the side of the rotor approximately in the plane of the uppermost portion of the latter whereby to permit direct transfer from and to the conveyer.

In testimony whereof I affix my signature.

KARL SCHULTE.